(12) United States Patent
Nagae

(10) Patent No.: US 7,429,414 B2
(45) Date of Patent: Sep. 30, 2008

(54) TEMPERATURE-INDICATING TAPE AND DEVICE FOR CREATING LABELS USING THE SAME

(75) Inventor: Tsuyoshi Nagae, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 198 days.

(21) Appl. No.: 11/291,917

(22) Filed: Dec. 2, 2005

(65) Prior Publication Data
US 2006/0121229 A1 Jun. 8, 2006

(30) Foreign Application Priority Data
Dec. 7, 2004 (JP) ............................. 2004-353810

(51) Int. Cl.
*B32B 9/00* (2006.01)
*B32B 33/00* (2006.01)

(52) U.S. Cl. ..................... 428/40.1; 428/906; 428/913

(58) Field of Classification Search ................ 428/40.1, 428/906, 913
See application file for complete search history.

(56) References Cited

U.S. PATENT DOCUMENTS
5,685,654 A  11/1997  Nagao et al.
2002/0105673 A1  8/2002  Kurashina FOREIGN PATENT DOCUMENTS
EP  0 322 918 A2  7/1989
EP  1 084 852 A1  3/2001
EP  1 191 317 A1  3/2002
EP  1 405 890 A1  4/2004
JP  Y2-2559473  1/1993
WO  WO 01/88483 A1  11/2001
WO  WO 01/98741 A2  12/2001
WO  WO 03/003332 A2  1/2003

*Primary Examiner*—Patricia L Nordmeyer
(74) *Attorney, Agent, or Firm*—Oliff & Berridge, PLC

(57) ABSTRACT

A tape-like label forming device is capable of forming a label tape that is made up of a printing tape and a double-sided tape. A temperature-indicating material that changes color in response to changes in ambient temperature is applied to the surface of the printing tape. With this construction, since the color of the temperature-indicating material conceals the colors of the double-sided tape and characters such as letters and symbols printed on the underside of the printing tape, the colors of the characters and the double-sided tape can be freely selected and combined.

17 Claims, 5 Drawing Sheets

(BASE) BLUE AT 5°C OR LESS ← (TOP INDICATOR) ORANGE (BASE) BLUE → (TOP INDICATOR) RED AT 25°C OR GREATER (TOP INDICATOR) BLUE ← (BASE) WHITE AT 38-45°C → (BOTTOM INDICATOR) RED

TEMPERATURE-INDICATING TAPE AND DEVICE FOR CREATING LABELS USING THE SAME

BACKGROUND OF THE INVENTION

1. Field of the Invention

The present invention relates to a temperature-indicating, printable medium and a label forming device using the medium, wherein the temperature-indicating medium changes color in response to changes in ambient temperature.

2. Description of the Related Art

Tape that has the capacity to change color due to ambient temperatures is well known in the art. By affixing this tape to an object, it is possible to visually detect changes in temperature changes around the object or changes in the temperature of the object itself. For example, beer cans and the like using this tape have been sold on the market. The tape, which is fixed to the beer can, changes color based on the ambient temperature of the can, revealing to what degree the beer in the can is chilled. However, in order to print letters, symbols, or other characters on such a tape that changes color due to changes in ambient temperature, the tape must be custom-ordered from a specialist. Hence, it is costly and time-consuming to obtain this tape.

Japanese Utility Model Publication No. 2559473 discloses a tape-like label forming device for producing a tape that changes colors according to changes in ambient temperature. The device employs a tape-like printing medium that includes a double-sided tape portion having a layer with a temperature-indicating material; and a printing tape portion on which characters such as letters and symbols are printed.

The tape-like label forming device according to the publication described above succeeds in eliminating the time and costs required for special ordering a temperature-indicating tape that has printed desired characters or symbols. However, since a layer with the temperature-indicating material is provided in the double-sided tape portion of the tape-like printing medium and characters can be printed on a printing tape portion of the printing medium, the characters must be printed in the same color as the temperature-indicating material in order to assimilate the characters in the material. Note that the tape-like label thus produced is used, for example, to reveal the characters at a temperature of a certain degree and conceal the characters at a temperature above or below this degree. Accordingly, the device proposed in Japanese Utility Model Publication No. 2559473 has a limitation regarding what colors can be used for the characters and the temperature-indicating material. In addition, the tape-like printing medium can only be used for determining temperatures above a certain degree or below a certain degree. Further, before producing the tape with this device, it is impossible to tell how the tape will change based solely on the external appearance.

SUMMARY OF THE INVENTION

In view of the foregoing, it is an object of the present invention to resolve the problematic points described above by providing a printing medium formed by applying a temperature-indicating or temperature-sensitive material to the printing tape side of a printing medium, whereby any color of temperature-indicating material and any color of printed text can be combined.

It is another object of the present invention to provide a tape-like label forming device capable of reliably printing such a printing medium.

The above and other objects will be attained by a printing medium on which ink is deposited to print images, such as, letters, symbols or character images, and the like. The printing medium includes a printing tape and a double-sided tape. A temperature-indicating material that changes color in response to changes in ambient temperature is applied to the surface of the printing tape.

With this construction, the color of the temperature-indicating material conceals the color of the double-sided tape and the letters, symbols, and other characters images printed on the underside surface of the printing tape. Hence, the printing medium having this construction makes it possible to select and to combine any color of characters with any color of double-sided tape. The color of the temperature-indicating material may also be freely selected without regard for the color of the characters.

The printing medium described above may include a layer in the double-sided tape having a temperature-indicating material that also changes color in response to changes in ambient temperature.

With this construction, the temperature-indicating material on the surface of the printing tape functions to reveal or conceal characters printed on the underside surface of the printing tape, while the temperature-indicating material on the double-sided tape functions to reveal or assimilate characters printed on the underside surface of the printing tape according to the color of the temperature-indicating material on the double-sided tape. Further, by selecting an appropriate color for the temperature-indicating material on the surface of the printing tape, this material functions as decoration for the printing medium. Similarly, the temperature-indicating material in the double-sided tape functions as decoration for accentuating characters printed on the underside surface of the printing tape. By combining these functions, it is possible to create multicolored tape that is suitable for the objective.

It is desirable that the temperature-indicating material of the printing medium described above changes from a colored state to a colorless state according to changes in the ambient temperature.

The moment when the temperature-indicating material changes from colored to colorless indicates that the ambient temperature has reached the temperature at which the temperature-indicating material changes color. By changing to a colorless state, the temperature-indicating material reveals a message written in characters that have been printed on the underside of the printing tape, such as a warning or condition.

Conversely, the temperature-indicating material may change from a colorless state to a colored state due to changes in the ambient temperature.

The moment that the temperature-indicating material changes from a colorless to a colored state indicates that the ambient temperature has reached a temperature at which the temperature-indicating material changes color. At this time, characters printed on the underside of the printing tape, which have been revealed until this moment, can be concealed.

The temperature-indicating material applied to the surface of the printing tape may change color at a temperature different from the temperature that the temperature-indicating material included in the layer of the double-sided tape changes color.

Hence, it is possible to form tape-like labels that can detect a range from a certain temperature to another certain temperature. This printing medium can also indicate the ambient temperature in three divisions.

According to another aspect of the present invention, there is provided a tape cassette that includes, first to third spools, the printing tape as described above that is wound around the first spool, the double-sided tape as described above that is would around the second spool, and an ink ribbon would around the third spool. Letters, symbols or character images are printable on the first surface of the printing tape using the ink ribbon.

According to still another aspect of the present invention, there is provided a tape-like label forming device that includes a tape cassette receiving portion, a printing section, a determining unit, and a display. The tape cassette receiving portion receives a tape cassette. The cassette tape accommodates a printing medium as described above. The printing section prints images, such as letters, symbols or the like on the first surface of the printing tape. The determining unit determines a type of the temperature-indicating material. The type of the temperature-indicating material refers to information that identifies the temperature-indicating material, such as, a material name, a trade name of the material, a manufacturer or the like. The display displays the type of the temperature-indicating material determined by the determining unit.

With the tape-like label forming device having this construction, an operator can learn the properties of the tape-like label from the display that cannot be learned from the appearance of the label about to be created, thereby eliminating failures in tape formation.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE EMBODIMENTS

Figure 1:
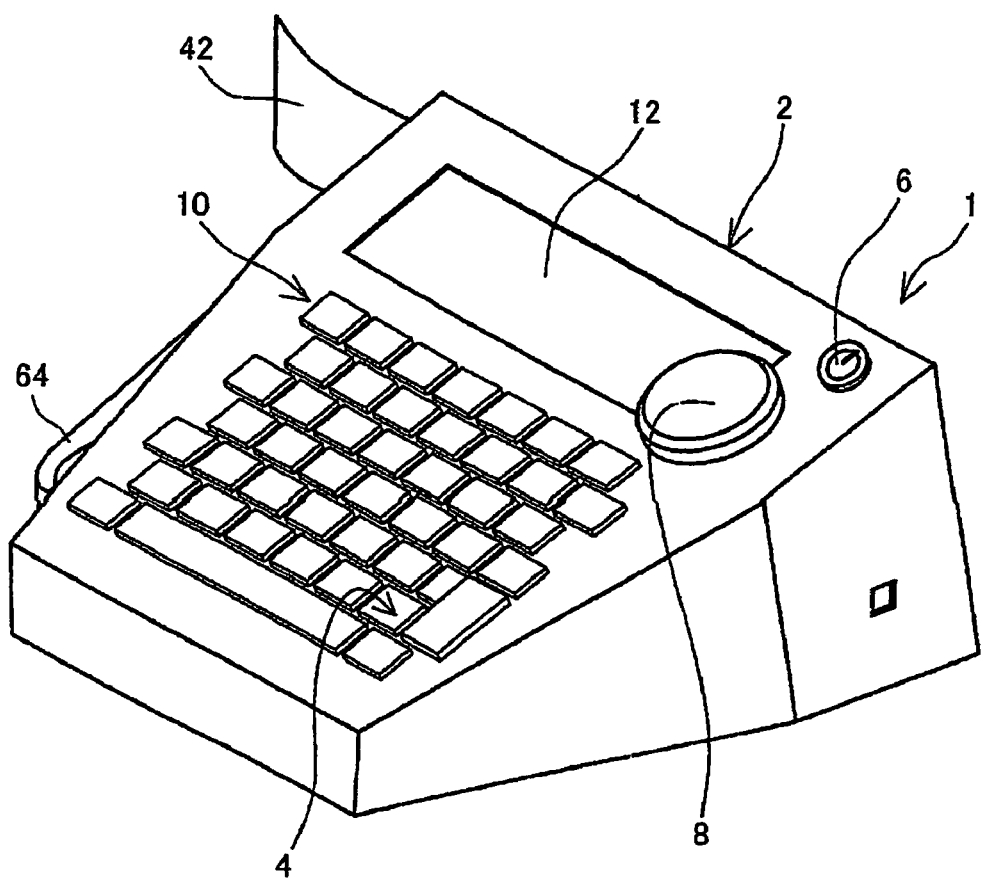
FIG. 1 is a perspective view showing the external appearance of a tape-like label forming device according to a first embodiment of the present invention.
Figure 2:
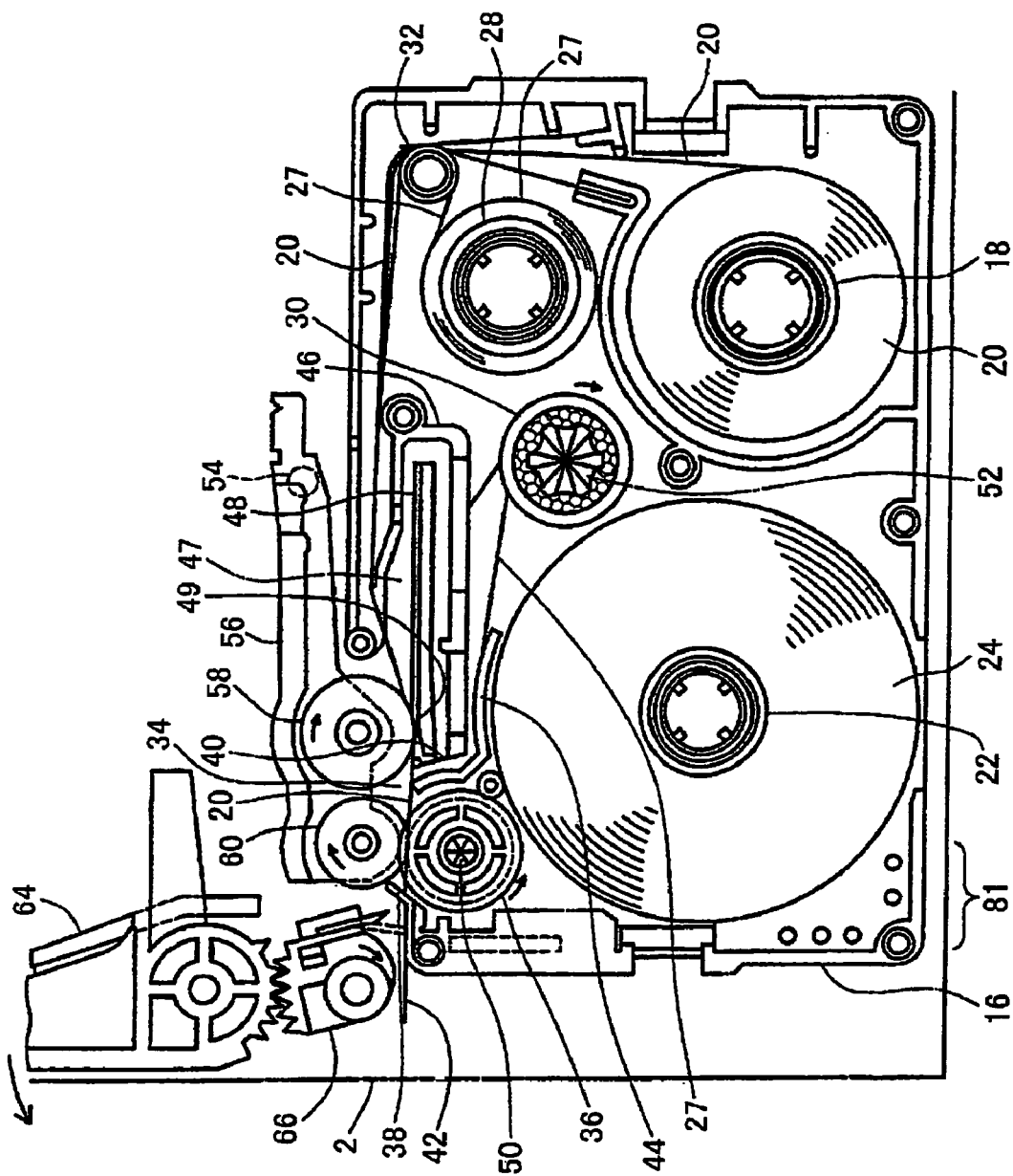
FIG. 2 is a side cross-sectional view showing a tape cassette mounted on the tape-like label forming device.
Figure 3:
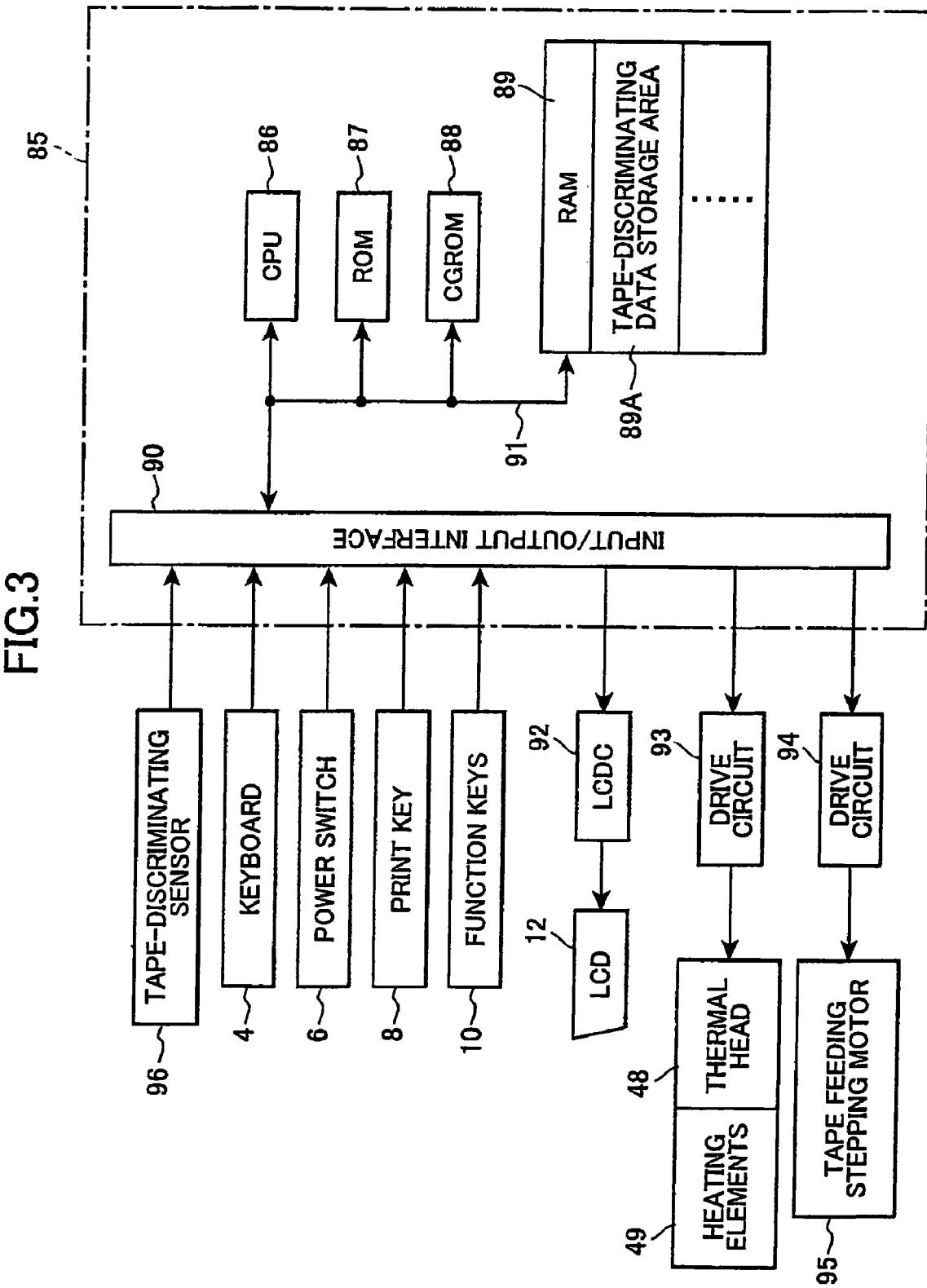
FIG. 3 is a block diagram showing the control structure of the tape-like label forming device.
Figures 4, 5A, 5B, 5C:
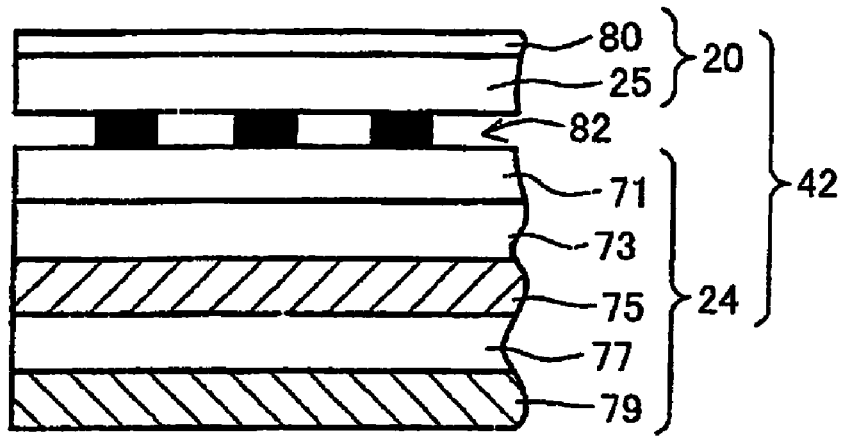
FIG. 4 is a side view showing the structure of a tape-like label according to the first embodiment.
FIGS. 5A through 5C are explanatory diagrams of sample displays displayed on a liquid crystal display indicating the type of temperature-indicating tape.

A tape-like label forming device according to a first embodiment of the present invention will be described while referring to the accompanying drawings. First, the overall structure of the tape-like label forming device will be described with reference to FIGS. 1 through 5C. FIG. 1 is a perspective view showing the external appearance of a tape-like label forming device according to the first embodiment of the present invention. FIG. 2 is a side cross-sectional view showing a tape cassette mounted on the tape-like label forming device. FIG. 3 is a block diagram showing a control structure of the tape-like label forming device. FIG. 4 is a side view showing the structure of a tape-like label according to the first embodiment. FIGS. 5A through 5C are explanatory diagrams of sample displays displayed on a liquid crystal display for indicating the type of temperature-indicating tape.

As shown in FIG. 1, a tape-like label forming device 1 according to the first embodiment includes a casing 2 having a sloped top surface, and a keyboard 4 disposed in the top surface of the casing 2. Also in the top surface of the casing 2 above the keyboard 4, the tape-like label forming device 1 includes a power switch 6, a print key 8, a group of function keys 10 for controlling the tape-like label forming device 1 to perform various functions, and a liquid crystal display (hereinafter abbreviated as LCD) 12 for displaying inputted letters, symbols, and other characters.

The bottom surface of the casing 2 is configured so that a tape cassette 16 can be detachably mounted thereon. FIG. 2 shows the internal structure of the casing 2 and tape cassette 16 when the tape cassette 16 is mounted in the casing 2.

A printing tape spool 18 and a double-sided tape spool 22 are rotatably provided in the tape cassette 16. A printing tape 20 is wound about the printing tape spool 18. A double-sided tape 24 having a double-sided release paper 79 (see FIG. 4) fixed on only one side surface is wound about the double-sided tape spool 22 with the double-sided release paper 79 facing outward.

As shown in FIG. 4, the printing tape 20 is formed of a transparent polyester film 25, the top surface of which is coated with a temperature-indicating material 80. At a certain temperature, the temperature-indicating material 80 changes from a colorless state to a colored state or from a colored state to a colorless state.

The double-sided tape 24 is formed of five layers, shown in detail in FIG. 4. In order from the top layer, the double-sided tape 24 includes a transparent adhesive layer 71, a polyester film 73, a printing layer 75, an adhesive layer 77, and the double-sided release paper 79.

A ribbon-supplying spool 28 is also rotatably disposed in the tape cassette 16. An ink ribbon 27 formed of a base film that has been coated with a thermofusible ink is wound around the ribbon-supplying spool 28 with the ink-coated surface facing inward prior to printing. After printing, the ink ribbon 27 is wound around a ribbon take-up spool 30.

From the printing tape spool 18, the printing tape 20 is led about a guide pin 32 to a roller access opening 34. Here, a tape feed roller 36 discharges the printing tape 20 out of the tape cassette 16 through a slit formed in the bottom of a tape holder 38.

The ink ribbon 27 passes from the ribbon-supplying spool 28 between the printing tape 20 and guide pin 32 and travels to the roller access opening 34 overlapped by the printing tape 20. Here, the ink ribbon 27 changes course by nearly 180° via a separating plate 40 and arrives at the ribbon take-up spool 30. The separating plate 40 is fixed in a position separated a prescribed distance downstream of a thermal head 48 described later with respect to the conveying direction of the ink ribbon 27. The separating plate 40 functions to separate the ink ribbon 27 from the printing tape 20.

The double-sided tape 24 travels from the double-sided tape spool 22 to the tape feed roller 36, bonds with the printing tape 20 to form a label tape 42, and proceeds out of the tape cassette 16. The printing tape 20, double-sided tape 24, and ink ribbon 27 are each wound in equivalent lengths about their respective spools printing tape spool 18, double-sided tape spool 22, and ribbon-supplying spool 28.

A partitioning wall 44 is disposed between the ink ribbon 27 and double-sided tape 24 near the roller access opening 34. The partitioning wall 44 prevents the flexible ink ribbon 27 from bonding with the adhesive surface of the double-sided tape 24 and being drawn out of the tape cassette 16 together with the double-sided tape 24.

A peripheral wall 46 is provided inside the roller access opening 34 and an insertion hole 47 for accommodating the thermal head 48 is surrounded by the peripheral wall 46 and the ink ribbon 27. The thermal head 48, which is mounted in the casing 2, can be inserted into the insertion hole 47 when the tape cassette 16 is mounted in the casing 2. Heating elements 49 are provided on the end of the thermal head 48 and arranged perpendicular to the conveying direction of the ink ribbon 27.

The casing 2 is also provided with a tape feed drive shaft 50 that fits into the tape feed roller 36 and a ribbon take-up spool drive shaft 52 that fits into the ribbon take-up spool 30 when the tape cassette 16 is mounted in the casing 2. The tape feed drive shaft 50 and ribbon take-up spool drive shaft 52 are driven by a tape-feeding stepping motor 95 (see FIG. 3).

A pivoting shaft 54 is also fixed in the casing 2. The pivoting shaft 54 pivotably supports a roller holder 56. An adjustable platen roller 58 and a drive roller 60 are rotatably held in the roller holder 56. A roller release lever (not shown) functions to pivot the roller holder 56 about the pivoting shaft 54. By pivoting the roller holder 56 with the roller release lever so that the platen roller 58 and drive roller 60 are inserted into the roller access opening 34, the overlapped printing tape 20 and ink ribbon 27 exposed in the roller access opening 34 can be pinched between the platen roller 58 and the heating elements 49 of the thermal head 48. Farther downstream, the printing tape 20 is superimposed over and fixed to the double-sided tape 24 between the drive roller 60 and the tape feed roller 36.

Downstream of the drive roller 60, the casing 2 is provided with a cutting lever 64, and a rotating cutter 66 that rotates in association with a pivoting motion of the cutting lever 64.

Next, a control system for the tape-like label forming device 1 having the construction described above will be described with reference to FIG. 3. As shown in FIG. 3, the core of the tape-like label forming device 1 is a control unit 85. The control unit 85 includes a CPU 86, a ROM 87, a CGROM 88, a RAM 89, and an input/output interface 90, all of which components are connected together via a bus 91.

The ROM 87 stores various programs including programs required for controlling the tape-like label forming device 1, such as a print control program. The CPU 86 performs various computations based on the programs stored in the ROM 87. The ROM 87 also stores outline data defining the outlines of letters and other characters in association with code data that has been sorted according to font type.

The CGROM 88 stores dot pattern data corresponding to each character inputted via the keyboard 4. The CPU 86 reads the dot pattern data from the CGROM 88 and displays dot patterns on the LCD 12 based on this data. The RAM 89 functions to temporarily store results of the computations performed by the CPU 86. The RAM 89 is provided with a tape-discriminating data storage area 89A for storing a tape-discriminating data table (not shown). When a tape-discriminating sensor 96 detects the type of tape cassette 16 mounted in the casing 2, the CPU 86 reads data outputted from the tape-discriminating sensor 96 and references the tape-discriminating data storage area 89A to determine the type of tape cassette 16. The RAM 89 is also provided with other memory areas including a text memory area, an image buffer, and a print buffer.

The input/output interface 90 of the control unit 85 is also connected to the tape-discriminating sensor 96, the keyboard 4, the power switch 6, the print key 8, and the group of function keys 10. A display controller (LCDC) 92 is also connected to the input/output interface 90 for driving the LCD 12. When the user inputs characters via the keyboard 4, text data for these characters is sequentially stored in the text memory of the RAM 89 and the CPU 86 displays dot patterns corresponding to the inputted characters on the LCD 12 based on a dot pattern generation control program and a display control program. A drive circuit 93 is also connected to the input/output interface 90 for driving the thermal head 48. The drive circuit 93 drives the thermal head 48 to print dot pattern data on the printing tape 20 via the ink ribbon 27 and in cooperation with the platen roller 58. The thermal head 48 prints dot pattern data that has been transferred from the image buffer to the print buffer in the RAM 89. A drive circuit 94 is also connected to the input/output interface 90 for driving the tape-feeding stepping motor 95. When driven by the drive circuit 94, the tape-feeding stepping motor 95 works in cooperation with the drive roller 60 to affix the printed printing tape 20 to the double-sided tape 24 and to discharge the two as the label tape 42.

Next, the procedure for forming the label tape 42 with the tape-like label forming device 1 having this construction will be described.

With the tape cassette 16 mounted in the tape-like label forming device 1, the operator presses the power switch 6 to turn on the tape-like label forming device 1. At this time, the tape-discriminating sensor 96 provided on the casing 2 determines the type of tape cassette 16 that is mounted in the tape-like label forming device 1. More specifically, a plurality of tape type identifying holes 81 is formed in the bottom wall of the tape cassette 16, as shown in FIG. 2. The type of the tape cassette 16 can be determined according to the combination of the tape type identifying holes 81. The tape-discriminating sensor 96 is configured of push switches capable of reading the tape type identifying holes 81 and outputs identification data to the input/output interface 90. The CPU 86 operating according to instructions in a program stored in the ROM 87 compares this identification data to the tape-discriminating data table stored in the tape-discriminating data storage area 89A and drives the display controller 92 to display the type of tape cassette 16 on the LCD 12. Sample displays are shown in FIGS. 5A through 5C. FIG. 5A indicates that the orange temperature-indicating material 80 formed on the top side will become transparent at 5° C. or below, revealing the blue base color of the double-sided tape 24. FIG. 5B indicates that the red temperature-indicating material 80 on the top side will conceal the blue base color of the double-sided tape 24 when the temperature reaches 25° C. or higher. FIG. 5C indicates that the blue temperature-indicating material 80 on the top side will conceal the white base color of a double-sided tape 24a at 38° C. or below and that a red temperature-indicating material 80a provided on the bottom side will conceal the double-sided tape 24a at a temperature of 45° C. or above (see the third embodiment described below). From this information, the operator can learn the type of the tape cassette 16 and the features of the label tape 42 that cannot be learned from the external appearance of the tape cassette 16 prior to creating the label tape 42. Hence, this information can prevent mistakes in tape formation.

If the information displayed on the LCD 12 is not desirable to the operator, the operator can switch off the power source to the tape-like label forming device 1, replace the tape cassette 16, and repeat the operation described above. When the desired tape cassette 16 is mounted in the tape-like label forming device 1, the operator uses the keyboard 4 and function keys 10 to input desired letters and symbols, and subsequently presses the print key 8.

After the operator presses the print key 8, the control unit 85 in the tape-like label forming device 1 feeds the printing tape 20 and the ink ribbon 27 at a prescribed speed while controlling the supply of power to the thermal head 48 based on the inputted character data and heating the heating elements 49. As a result, characters 82 (see FIG. 4) are printed on the printing tape 20 in reverse. Subsequently, the double-sided tape 24 is fixed to the printed surface of the printing tape 20 and the printing tape 20 and double-sided tape 24 are discharged as the label tape 42. At this time, the operator rotates the cutting lever 64 in the direction indicated by an arrow in FIG. 2 (counterclockwise in the drawing), causing the rotating cutter 66 to rotate in the direction of the arrow (clockwise) and cut off the discharged label tape 42.

The label tape 42 can be affixed to a desired location after peeling off the double-sided release paper 79. The temperature-indicating material 80 that has been applied to the top surface of the transparent polyester film 25 in the label tape 42 changes color in response to changes in temperature of the object to which the temperature-indicating material 80 has been affixed or changes in temperature around the location at which the temperature-indicating material 80 has been affixed. This color change either reveals or conceals the characters 82 printed on the underside of the printing tape 20.

For example, the printing tape 20 may be coated with a temperature-indicating material 80 that is colored at room temperature and that becomes transparent at a low temperature. When forming the label tape 42, the characters "Chilled" can be printed on the printing tape 20. If the label tape 42 is subsequently fixed to a can of beer and the can placed in a refrigerator or the like to be chilled, the temperature-indicating material 80 coated on the printing tape 20 that conceals the printed characters at room temperature will become transparent when the can reaches a low temperature to reveal the characters "Chilled." Hence, it is easy to determine when the can is in a chilled state. With this application, the characters 82 printed on the printing tape 20 and the double-sided tape 24 can be any color, provided that the characters are legible. The temperature-indicating material 80 may also be any color, provided that the color is dark enough to conceal the characters 82.

In the tape-like label forming device 1 according to the first embodiment described above, the label tape 42 is made up of the printing tape 20 and the double-sided tape 24, and the surface of the printing tape 20 is coated with the temperature-indicating material 80, which changes color in response to changes in the ambient temperature. With this construction, the color of the temperature-indicating material 80 conceals the colors of the characters 82 printed on the underside of the printing tape 20 and the double-sided tape 24, so that the colors of the characters 82 and the double-sided tape 24 can be freely selected and combined. The color of the temperature-indicating material 80 may also be freely selected without regard for the color of the characters 82.

Further, since the temperature-indicating material 80 coated on the surface of the printing tape 20 changes from a colored state to a colorless state in response to changes in the ambient temperature, the label tape 42 indicates when a specific temperature is reached by the temperature-indicating material 80 changing from a colored to a colorless state. Further, a warning message or a message indicating a condition that is printed on the underside surface of the printing tape 20 in the characters 82 can be revealed when the temperature-indicating material 80 becomes transparent in order to draw the attention of an observer.

Further, since the temperature-indicating material 80 coated on the surface of the printing tape 20 changes from a colorless state to a colored state due to changes in the ambient temperature, this change also indicates when a specific temperature has been reached. At this time, the temperature-indicating material 80 conceals the characters 82 printed on the underside of the printing tape 20 that had been revealed until this change occurred, thereby reassuring the observer.

By providing the tape-like label forming device 1 with the tape-discriminating sensor 96 that detects the type of the temperature-indicating material 80, and the LCD 12 that displays a description of the temperature-indicating material 80 detected by the tape-discriminating sensor 96, the operator can reference the display on the LCD 12 to learn the features of the label tape 42 prior to creating the label tape 42. Since the features of the label tape 42 cannot otherwise be known without this display, this display can prevent mistakes in tape formation.

Figure 6:
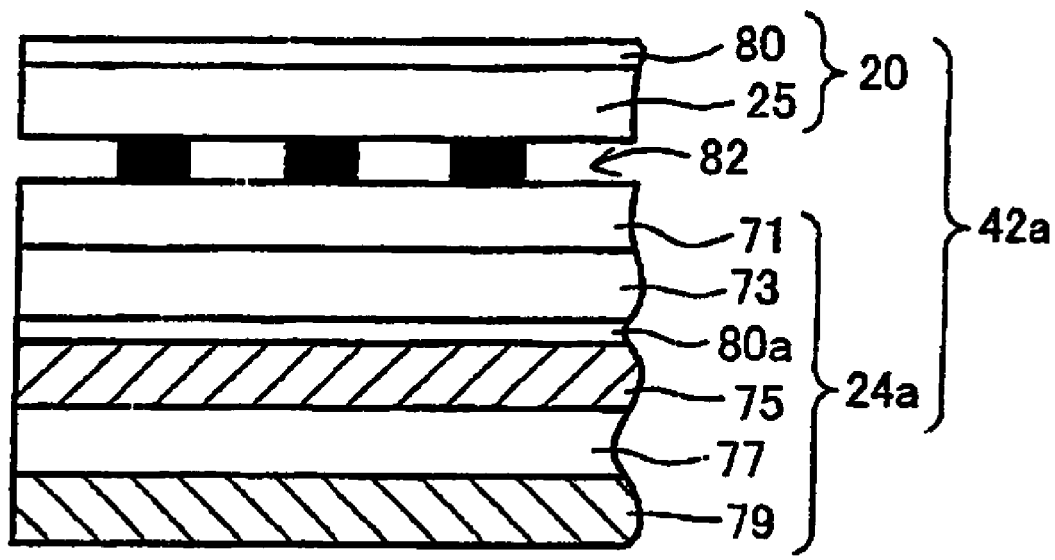
FIG. 6 is a side view showing the structure of a tape-like label according to second and third embodiments of the present invention.

Next, a tape-like label forming device 1 according to a second embodiment of the present invention will be described with reference to FIG. 6. As shown in FIG. 6, the tape-like label forming device 1 of the second embodiment forms a label tape 42a that is different from the label tape 42 created with the tape-like label forming device 1 of the first embodiment. FIG. 6 is a side view showing the structure of the label tape 42a, where like parts and components are designated with the same reference numerals to avoid duplicating description.

As shown in FIG. 6, the label tape 42a includes the printing tape 20, and a double-sided tape 24a. The printing tape 20 is configured of the transparent polyester film 25, the top surface of which has been coated with the temperature-indicating material 80. Here, the temperature-indicating material 80 may change from a colorless state to a colored state or from a colored state to a colorless state at a given temperature.

Unlike the double-sided tape 24 in the first embodiment, the double-sided tape 24a is configured of six layers. Specifically, the double-sided tape 24a includes in order from the top surface the transparent adhesive layer 71, the polyester film 73, a temperature-indicating material 80a, the printing layer 75, the adhesive layer 77, and the double-sided release paper 79. The temperature-indicating material 80a is applied with adhesive to the polyester film 73 side surface of the printing layer 75. Prior to creating the label tape 42a, the printing tape 20 and the double-sided tape 24a are provided separately along with the ink ribbon 27 and other materials in the tape cassette 16.

In order to form the label tape 42a, the operator mounts the tape cassette 16 in the tape-like label forming device 1 and presses the power switch 6. After confirming that the desired tape cassette 16 is mounted in the tape-like label forming device 1 by referencing the LCD 12, the operator inputs desired letters, symbols, and other characters using the keyboard 4 and the function keys 10 and subsequently presses the print key 8.

At this time, the control unit 85 of the tape-like label forming device 1 conveys the printing tape 20 and the ink ribbon 27 at a prescribed speed, controls the current supply to the thermal head 48 based on data for the inputted characters, and heats the heating elements 49. As a result, the inputted characters 82 are printed on the printing tape 20 in reverse. Subsequently, the double-sided tape 24a is bonded to the printed surface of the printing tape 20 and the printing tape 20 and double-sided tape 24a are discharged as the label tape 42a. At this time, the operator rotates the cutting lever 64 in the direction of the arrow in FIG. 2 (counterclockwise), causing the rotating cutter 66 to rotate in the direction of the arrow in FIG. 2 (clockwise) to cut off the discharged label tape 42a.

As described above, the label tape 42a is made up of the printing tape 20 and the double-sided tape 24a. Further, the surface of the printing tape 20 is coated with the temperature-indicating material 80, which changes color according to changes in the ambient temperature, and a layer including the temperature-indicating material 80*a*, which also changes color due to changes in the ambient temperature, is provided in the double-sided tape 24*a*. Accordingly, the temperature-indicating material 80 on the surface of the printing tape 20 functions to either reveal or conceal characters 82 printed on the underside of the printing tape 20, and the temperature-indicating material 80*a* in the double-sided tape 24*a* functions to either reveal or assimilate the characters 82 printed on the underside of the printing tape 20 according to the color of the temperature-indicating material 80*a* and the color on the back of the temperature-indicating material 80*a*. Further, by selecting an appropriate color for the temperature-indicating material 80 on the surface of the printing tape 20, this temperature-indicating material 80 serves as decoration for the label tape 42*a*. Similarly, the temperature-indicating material 80*a* in the double-sided tape 24*a* functions as decoration that accentuates the characters 82 printed on the underside of the printing tape 20 according to the color of the temperature-indicating material 80*a*, the changed color of the temperature-indicating material 80*a*, and the color on the back of the temperature-indicating material 80*a*. It is therefore advantageous that a variety of tape-like labels that meet an intended use can be produced with the use of functions described above.

Next, a tape-like label forming device 1 according to a third embodiment of the present invention will be described with reference to FIG. 6. In the label tape 42*a* according to the third embodiment, the temperature-indicating material 80 and the temperature-indicating material 80*a* change colors at different temperatures. However, the method for forming the structure of the label tape 42*a* is identical to that described in the second embodiment. Therefore, a description of the structure of the label tape 42*a* according to the third embodiment will not be included herein. Next, the function of the label tape 42*a* according to the third embodiment will be described.

The label tape 42*a* is applied to a desired location after peeling off the double-sided release paper 79. Since the temperature-indicating material 80 has been applied to the top surface of the transparent polyester film 25 in the printing tape 20 and the temperature-indicating material 80*a* has been applied to the polyester film 73 side surface of the printing layer 75, the temperature-indicating material 80 is the first to change color in response to changes in temperature of the object to which the label tape 42*a* has been applied or changes in ambient temperature at the location in which the label tape 42*a* has been applied, while the temperature-indicating material 80*a* changes color in response to further changes in temperature. These color changes function to reveal and conceal the characters 82 printed on the underside of the printing tape 20.

For example, when using the label tape 42*a* as a label for indicating an optimal temperature of a bath, the temperature-indicating material 80 in the printing tape 20 can be configured to be blue at room temperature and to become colorless at a temperature of 38° C. or greater. The temperature-indicating material 80*a* in the double-sided tape 24*a* can be configured to be white at room temperature and to become red at a temperature of 45° C. or greater. The message "optimal temperature" can be printed in red on the printing tape 20. When this label tape 42*a* is applied at a desired location of a bath, the message "optimal temperature" will remain concealed by the blue temperature-indicating material 80 while the temperature is between room temperature and 38° C., will be revealed as red characters beneath the white color of the temperature-indicating material 80*a* between the temperatures of 38° C. and 45° C., and will be assimilated with the red color of the temperature-indicating material 80*a* at temperatures of 45° C. or greater so that the user can easily determine when the bath water is at an appropriate temperature.

In the tape-like label forming device 1 of the third embodiment described above, the temperature-indicating material 80 applied to the surface of the printing tape 20 changes color at a different temperature than that of the temperature-indicating material 80*a* provided in a layer of the double-sided tape 24*a*. Hence, the tape-like label forming device 1 of the third embodiment can form a label tape 42*a* that can detect a range between a certain temperature and another temperature. Further, the ambient temperature can be indicated in three divisions.

The temperature-indicating material as described above has been known in the art and is available on the market. Examples of the temperature-indicating material include a thermochromic ink containing microcapsules encapsulating a thermochromic material therein, and a thermochromic pigment. It is generally preferable to use a reversible reaction type temperature-indicating material which changes color when the temperature rises from a first level to a second level and reverts to the original color when the temperature lowers from the second level to the first level. However, non-reversible reaction type temperature-indicating material is also available depending upon how the tape-like label is used.

While the invention has been described in detail with reference to specific embodiments thereof, it would be apparent to those skilled in the art that many modifications and variations may be made therein without departing from the spirit of the invention, the scope of which is defined by the attached claims.

Figure 7:
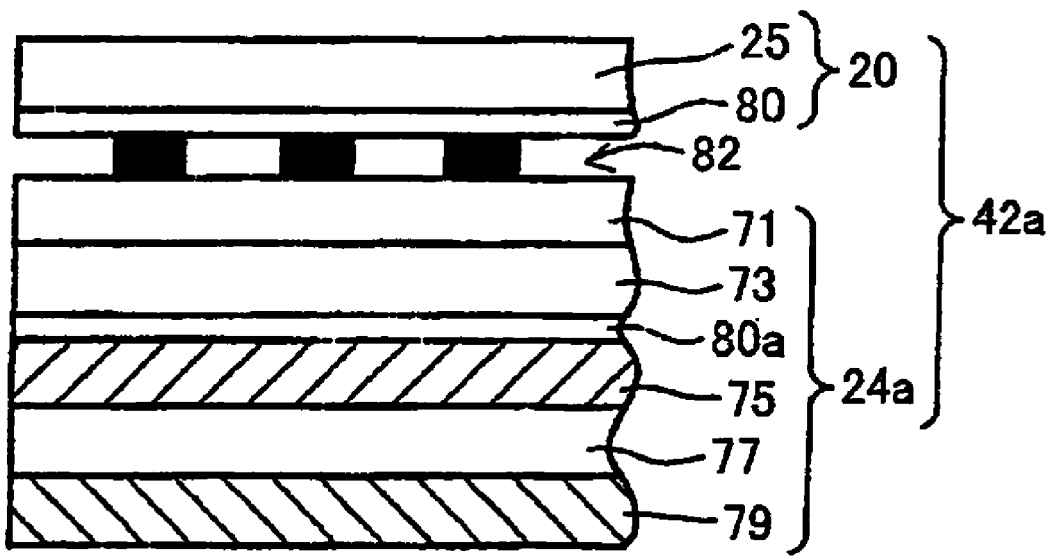
FIG. 7 is a side view showing the structure of a tape-like label according to a modification of the embodiments.

For example, in the embodiments described above, the temperature-indicating material 80 is applied to the top surface of the printing tape 20. However, the temperature-indicating material 80 may also be applied to the bottom surface of the printing tape 20, as shown in FIG. 7.

What is claimed is:

1. A printing medium comprising:
   a printing tape having a first surface on which images are printable and a second surface on which applied is a first temperature-indicating material that changes color in response to changes in ambient temperature; and
   a double-sided tape.

2. The printing medium according to claim 1, wherein the printing tape comprises a transparent polyester film.

3. The printing medium according to claim 2, wherein the double-sided tape comprises a first transparent adhesive layer, a printing layer, a second adhesive layer, and a release paper affixed to the second adhesive layer, wherein the first adhesive layer is adapted to be adhered to the first surface of the printing tape.

4. The printing medium according to claim 1, wherein the double-sided tape comprises a layer formed from a second temperature-indicating material that changes color in response to changes in ambient temperature.

5. The printing medium according to claim 4, wherein the double-sided tape further comprises a first transparent adhesive layer, a printing layer, a second adhesive layer, and a release paper affixed to the second adhesive layer, wherein when the first transparent adhesive layer is adhered to the first surface of the printing tape, the layer formed from a second temperature-indicating material is interposed between the first adhesive layer and the second adhesive layer.

6. The printing medium according to claim 4, wherein the first temperature-indicating material changes color at a temperature different from a temperature that the second temperature-indicating material changes color.

7. The printing medium according to claim 1, wherein the first temperature-indicating material changes from a colored state to a colorless state according to changes in the ambient temperature.

8. The printing medium according to claim 1, wherein the first temperature-indicating material changes from a colorless state to a colored state due to changes in the ambient temperature.

9. A tape cassette comprising:

a first spool;

a second spool;

a third spool;

a printing tape wound around the first spool, the printing tape having a first surface, and a second surface on which applied is a first temperature-indicating material that changes color in response to changes in ambient temperature;

a double-sided tape wound around the second spool; and an ink ribbon wound around the third spool, wherein images are printable on the first surface of the printing tape using the ink ribbon.

10. The tape cassette according to claim 9, wherein the printing tape comprises a transparent polyester film.

11. The tape cassette according to claim 10, wherein the double-sided tape comprises a first transparent adhesive layer, a printing layer, a second adhesive layer, and a release paper affixed to the second adhesive layer, wherein the first adhesive layer is adapted to be adhered to the first surface of the printing tape.

12. The tape cassette according to claim 9, wherein the double-sided tape comprises a layer formed from a second temperature-indicating material that changes color in response to changes in ambient temperature.

13. The tape cassette according to claim 12, wherein the double-sided tape further comprises a first transparent adhesive layer, a printing layer, a second adhesive layer, and a release paper affixed to the second adhesive layer, wherein when the first transparent adhesive layer is adhered to the first surface of the printing tape, the layer formed from a second temperature-indicating material is interposed between the first adhesive layer and the second adhesive layer.

14. The tape cassette according to claim 12, wherein the first temperature-indicating material changes color at a temperature different from a temperature that the second temperature-indicating material changes color.

15. The tape cassette according to claim 9, wherein the first temperature-indicating material changes from a colored state to a colorless state due to changes in the ambient temperature.

16. The tape cassette according to claim 9, wherein the first temperature-indicating material changes from a colorless state to a colored state due to changes in the ambient temperature.

17. A tape-like label forming device comprising:

a tape cassette receiving portion that receives a tape cassette accommodating a printing medium, the printing medium including a printing tape having a first surface and a second surface on which applied is a temperature-indicating material that changes color in response to changes in ambient temperature; and a double-sided tape;

a printing section that prints images on the first surface of the printing tape;

a determining unit that determines a type of the temperature-indicating material; and a display that displays the type of the temperature-indicating material determined by the determining unit.

* * * * *